United States Patent [19]

Doremus et al.

[11] Patent Number: 5,535,270
[45] Date of Patent: Jul. 9, 1996

[54] AUTOMATIC CALL DISTRIBUTOR HAVING MULTIPLE AUDIO SOURCES

[75] Inventors: Lonnie R. Doremus, Schaumburg; David L. Blaha, Aurora, both of Ill.

[73] Assignee: Rockwell International Corporation, Seal Beach, Calif.

[21] Appl. No.: 303,257

[22] Filed: Sep. 6, 1994

[51] Int. Cl.⁶ .............................. H04Q 3/64; H04M 3/00; H04M 1/64; H04M 15/00
[52] U.S. Cl. .............................. 379/266; 379/88; 379/127; 379/246; 379/309
[58] Field of Search .................................. 379/127, 157, 379/201, 246, 265, 266, 309, 374, 67, 88, 89

[56] References Cited

U.S. PATENT DOCUMENTS

| | | | |
|---|---|---|---|
| 4,763,353 | 8/1988 | Canale et al. ................... | 379/265 X |
| 4,811,382 | 3/1989 | Sleevi ............................ | 379/67 |
| 4,850,007 | 7/1989 | Marino et al. ................... | 379/67 |
| 4,879,743 | 11/1989 | Burke et al. .................... | 379/142 |
| 4,926,462 | 5/1990 | Ladd et al. ..................... | 379/67 |
| 4,942,598 | 7/1990 | Davis ............................ | 379/57 |
| 4,953,204 | 10/1990 | Cuschleg, Jr. et al. ........... | 379/266 |
| 4,996,704 | 2/1991 | Brunson ......................... | 379/67 |
| 5,278,894 | 1/1994 | Shaw ............................. | 379/67 |
| 5,335,269 | 8/1994 | Steinlicht ...................... | 379/265 X |

*Primary Examiner*—Jeffery Hofsass
*Assistant Examiner*—Harry S. Hong
*Attorney, Agent, or Firm*—C. B. Patti; S. R. Hewitt

[57] ABSTRACT

An automatic call distributor 16 and method for routing incoming telephone calls from a central office telephone switching system 14 to a plurality of agent stations 18 and 20 and for providing different types of audio communications, preferably music, to incoming telephone calls based on the gate 28 and 30 through which the telephone calls are routed are provided. The automatic call distributor 16 includes a control computer 24 for routing incoming telephone calls to the gates 28 and 30. Music sources 38 and 40 generate predetermined types of music in response to the control computer 24. The music sources 38 and 40 are connected to the gates 28 and 30, respectively, to provide the predetermined types of music to incoming telephone calls routed through the respective gates 28 and 30.

19 Claims, 2 Drawing Sheets

AUTOMATIC CALL DISTRIBUTOR HAVING MULTIPLE AUDIO SOURCES

BACKGROUND OF THE INVENTION

The present invention relates generally to an automatic call distributor for connecting incoming telephone calls to selected ones of a plurality of agents and, more particularly, to an automatic call distributor having multiple audio sources to provide different types of audio communications, such as messages and music, to the incoming telephone call based on the gate to which the telephone call is directed. The present invention further comprises a method for providing a variety of different types of audio communications to incoming telephone calls in an automatic call distributor.

Automatic call distributors are well known and widely used by businesses to route incoming telephone calls to appropriate agents. Such businesses may service a variety of customers having different needs. For example, a mail order company may receive orders from French-speaking customers in Canada, English-speaking customers in the United States and Spanish-speaking customers in Mexico. To properly service these customers, the mail order business must have French, English and Spanish speaking agents to receive the orders and to answer any inquiries. Typically, the mail order business will have an eight hundred (800) number designated for each of the three languages. The automatic call distributor used by the mail order business then routes calls to the agents based on the 800 number dialed by the customer.

If all of the agents are unavailable for a certain 800 number, the automatic call distributor may place a customer in queue until an appropriate agent becomes available. While in queue, or on hold, messages or music may be played for the customer. Unfortunately, current automatic call distributors do not match message or music type to the characteristics of the customer, such as the language spoken by the customer.

Accordingly, a need exists for an automatic call distributor having multiple music sources which provide different types of audio communications, such as messages and music, to incoming telephone calls based on the characteristics of the incoming telephone callers and for a method of providing different types of messages and music to such callers.

SUMMARY OF THE INVENTION

This need is met by the automatic call distributor and method in accordance with the present invention wherein multiple music sources provide different types of audio communications, such as audio messages and music, to incoming telephone calls based on the gates through which the incoming telephone calls are routed.

In accordance with one aspect of the present invention, an automatic call distributor includes a plurality of gates for interconnecting incoming telephone calls from external callers and selected ones of a plurality of agents. A control computer receives the incoming telephone calls and routes each of the incoming telephone calls to a selected one of the gates. A plurality of audio sources, preferably music sources, controlled by the control computer generate predetermine types of audio communications, such as music. Each of the audio sources is associated with at least one of the plurality of gates to provide a predetermined type of audio communication to the incoming telephone calls routed through the at least one associated gate.

The control computer routes the incoming telephone calls based on information regarding the telephone calls received from a telephone switching system. The control computer may also route an incoming telephone call based on the telephone trunk over which the call was transmitted. The incoming telephone calls are thereafter routed to selected ones of the plurality of gates. The control computer places an incoming telephone call in queue when all agents at the selected gate are unavailable. An unavailable agent is an agent who is presently unable to accept an incoming telephone call.

In accordance with another aspect of the present invention, a method for providing one of a plurality of types of audio communications, preferably music, to an incoming telephone call made by an external caller is provided. The method comprises the steps of: routing the incoming telephone call to one of a plurality of gates; connecting a plurality of audio sources to the plurality of gates, each of the audio sources generating one of the plurality of types of audio communications; and activating one of the plurality of audio sources connected to the one gate through which the telephone call is routed when the incoming telephone call is placed in queue.

The step of routing the incoming telephone call may further comprise the step of identifying a telephone number, such as through dialed number identification system information, called by the external caller. The incoming telephone call is then routed to one of the gates based on the telephone number. Preferably, the step of routing the incoming telephone call comprises the step of identifying a telephone trunk over which the incoming telephone call is transmitted. The identified telephone trunk is then used to route the telephone call.

It is thus a feature of the present invention to provide an automatic call distributor which provides different types of audio communications based on the gate through which a telephone call is routed. In particular, it is a feature of the present invention to provide an automatic call distributor which plays different types of music based on the gate through which a telephone call is routed.

These and other features and advantages of the present invention will become apparent from the following detailed description, the accompanying drawings and the appended claims.

DETAILED DESCRIPTION OF THE INVENTION

Figure 1:
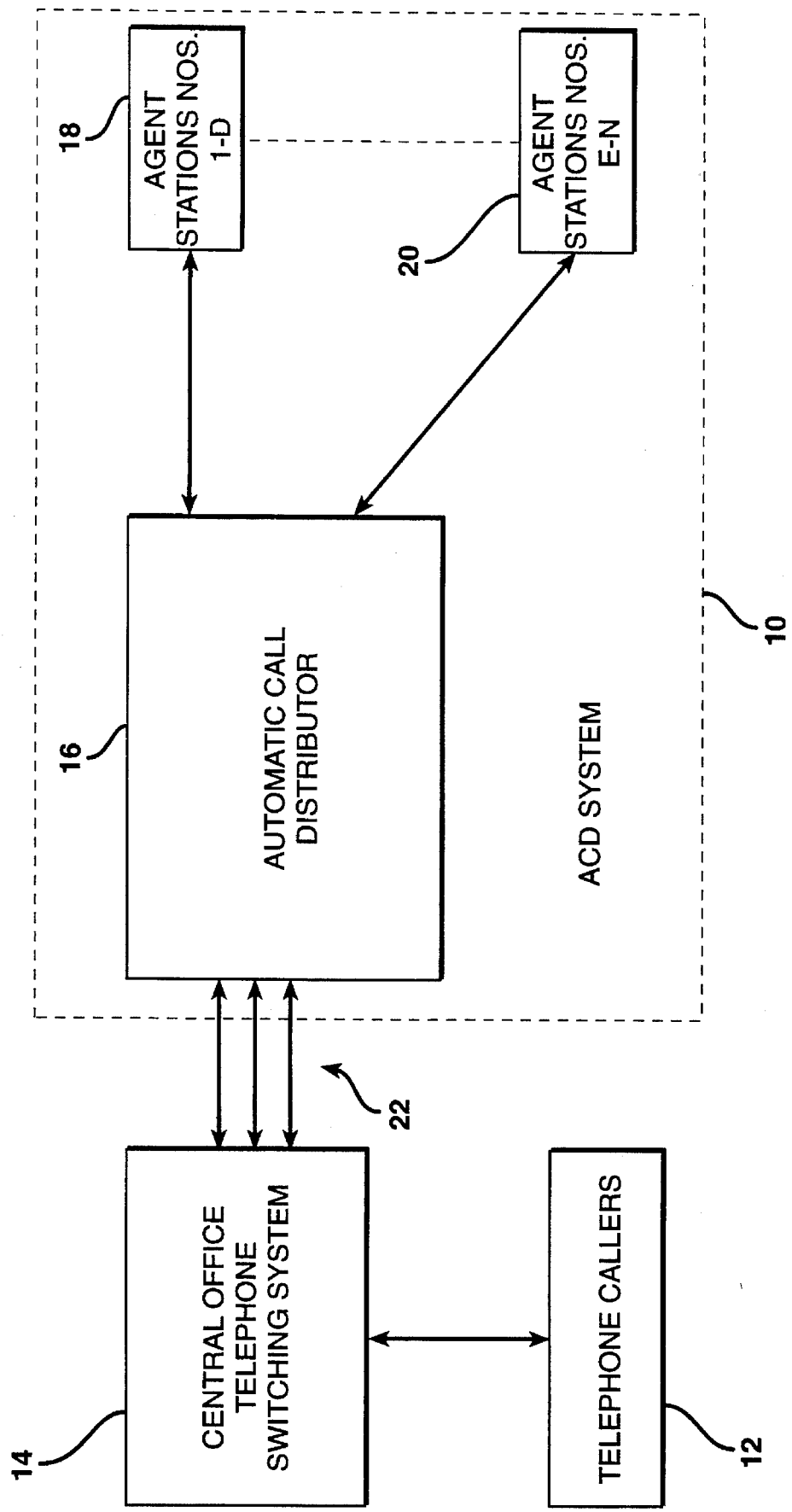
FIG. 1 is a block diagram of an automatic call distribution system including an automatic call distributor connected to a central office telephone switching system in accordance with the present invention.

An automatic call distribution (ACD) system 10 for routing incoming telephone calls from external telephone callers 12 via a central office telephone switching network 14 to a plurality of agents in accordance with the present invention is shown in FIG. 1. The ACD system 10 includes an automatic call distributor 16 connected to a plurality of agent stations 1 through N, of which agent stations 18 and 20 are shown in FIG. 1. The automatic call distributor 16 routes incoming telephone calls presented over telephone trunks 22 to the agents located at the agent stations 18 and Referring now to FIG. 2, the automatic call distributor 16 comprises an ACD control computer 24 connected to the plurality of telephone trunks 22. The control computer 24 may route incoming telephone calls based on conventional information supplied by the central office telephone switching system 14. For example, the telephone switching system 14 may provide a Dialed Number Identification Service (DNIS) which identifies the called number. Caller means 26 in the control computer 24 identifies the telephone numbers called by external callers based on the DNIS information.

The control computer 24 may route a call based on the telephone trunk on which an incoming telephone call is received. For instance, the control computer 24 may route a call based on the trunk group containing the telephone trunk 22 which transmitted the call. Additionally, the control computer 24 may address a data base of gate assignments for individual telephone trunks to route calls. Methods for routing calls in an ACD system based on information provided by the telephone switching network 14 and based on the telephone trunks over which the call are presented are well known in the art and will, therefore, not be further discussed herein.

Based on the telephone trunk or on the information provided by the telephone switching system 14, the control computer 24 routes calls to either ACD gate A 28 or ACD gate N 30. The ACD gates 28 and 30, in turn, route calls to agents positioned at respective agent stations 1–D or agent stations E–N, which are designated by reference numerals 18 and 20, respectively. The agent stations 18 and 20, and the agents positioned at those stations, are grouped together based on at least one common skill. For example, the agents at agent stations 1–D may be fluent in Spanish and the agents at agent stations E–N may be fluent in French. Thus, all calls which require a Spanish speaking agent would be routed to the ACD gate 28. Conversely, all calls which require a French speaking agent would be routed to the ACD gate 30. As should be readily apparent to those skilled in the art, each of the agent stations 1–D are separately connected to the ACD gate A 28 and each of the agent stations E–N are separately connected to the ACD gate N 30.

Figure 2:
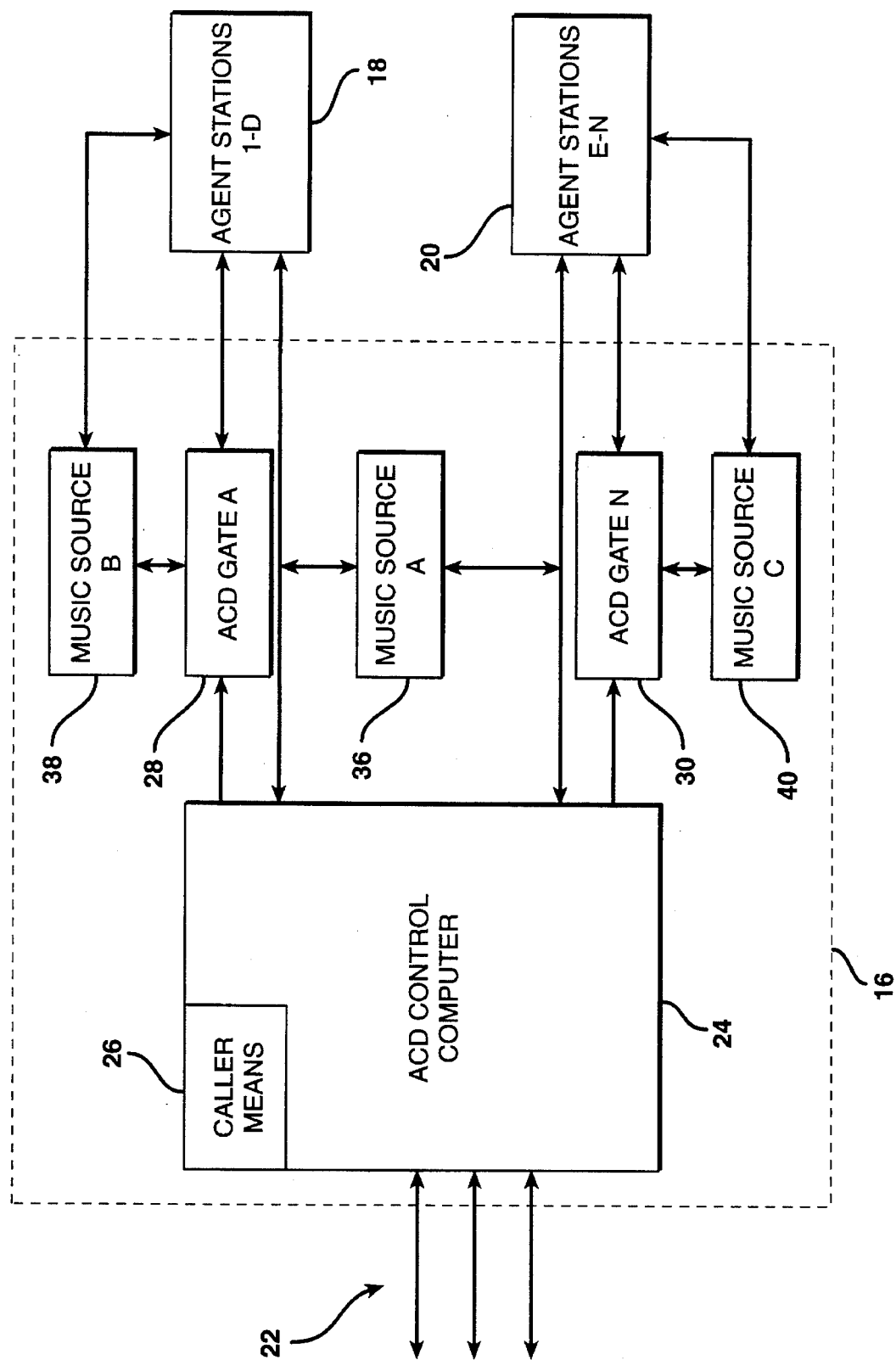
FIG. 2 is a block diagram of the automatic call distributor shown in FIG. 1.

Predetermined types of audio communications are generated by a plurality of audio sources, such as music sources A, B and C, designated by respective reference numerals 36, 38 and 40. Each of the music sources 36, 38 and 40, which are preferably digital music generators, are connected to the control computer 24 and are associated with at least one of the ACD gates 28 and 30. In FIG. 2, music sources 38 and 40 are connected to the ACD gates 28 and 30, respectively.

Although the exemplary operation of the present invention will be herein directed to providing different types of music to telephone callers, it should be understood that the invention may provide different types of messages or combinations of different types of messages and music. For example, the audio sources may generate messages in different languages. In addition, the audio sources may generate different messages for different needs of the callers. Telephone callers, for example, wishing to order products may be played an updated listing of new products based on the gates through which the calls are routed.

Continuing with the preceding example, the music source 38 would preferably provide Spanish music and the music source 40 would preferably provide French music. The music source 36 is connected between the agent stations 18 and the agent stations 20 to provide music to a caller when the caller is placed on hold by an agent. In a commercial embodiment of the present invention, four music sources have been advantageously employed.

In the automatic call distributor 16, an incoming call is presented over one of the telephone trunks 22 to the control computer 24. The control computer 24 receives information from the telephone switching system 14 concerning the incoming call. For example, the information may indicate that the caller requires a Spanish speaking agent. The control computer 24 detects the requirement of the caller and routes the call to the ACD gate 28, which is connected to the agent stations 18 having Spanish speaking agents. If all of the agents located at the agent stations 18 are unavailable, i.e. unable to presently accept an incoming telephone call, the control computer 24 places the call in queue and activates the music source 38. Music source 38 thereafter provides the caller with Spanish music, as the caller waits for the next available agent connected to the ACD gate 28.

Similarly, if the information indicated that the caller required a French speaking agent, the control computer 24 would have routed the call to the ACD gate 30, which is connected to the agent stations 20 having French speaking agents. If all of the agents at the agent stations 20 were unavailable, the music source 40 would have provided French music to the caller. It should be understood that any practical number of music sources, agent stations and ACD gates may be advantageously employed in the present invention.

The music source 36 preferably provides a type of generic music which is activated in response to an agent placing a call on hold. Thus, when an agent places a call on hold, the generic music generated by the music source 36 is played to the caller. The music source 36 may, of course, generate any type of music or audio message. It should be readily understood that the above music types are only exemplary and numerous types of music may be advantageously employed in the present invention. For example, soft, soothing music may be played to callers routed to agents who handle complaints or an audio description of the products sold by the user may be played to callers routed to agents who handle product orders.

Having thus described the invention in detail by way of reference to preferred embodiments thereof, it will be apparent that other modifications and variations are possible without departing from the scope of the invention defined in the appended claims.

What is claimed is:

1. An automatic call distributor comprising:

a plurality of gates for interconnecting incoming telephone calls from external callers with selected ones of a plurality of agents;

a control computer for receiving the incoming telephone calls and for routing each of the incoming telephone calls to a selected one of the gates;

a plurality of audio sources each of which generates a predetermined type of audio communication, each of the audio sources is connected to the control computer and is associated with at least one of the plurality of gates to automatically provide the predetermined type of audio communication to the incoming telephone calls routed through the at least one associated gate; and wherein the control computer detects when one of the telephone calls is placed on hold by one of the agents and activates one of the audio sources to provide an audio communication to the caller, the audio communication provided to the caller on hold being capable of being different than the predetermined type of audio communication associated with the at least one associated gate.

2. The automatic call distributor as claimed in claim 1 wherein the plurality of audio sources comprise a plurality of music sources each of which generates a predetermined type of music.

3. The automatic call distributor as claimed in claim 2 wherein the music sources are digital music generators.

4. The automatic call distributor as claimed in claim 2 wherein the control computer places an incoming telephone call in queue when all agents at the selected gate are unavailable and activates the music source associated with the selected gate to provide the predetermined music to the incoming telephone call, unavailable agents being unable to presently accept an incoming telephone call.

5. The automatic call distributor as claimed in claim 2 wherein the plurality of music sources comprises up to four music sources.

6. The automatic call distributor as claimed in claim 1 wherein the control computer comprises caller means for detecting telephone numbers called by the callers, and
wherein the control computer routes the telephone calls based on the telephone numbers.

7. The automatic call distributor as claimed in claim 6 wherein the caller means uses dialed number identification system information to detect the telephone numbers.

8. The automatic call distributor as claimed in claim 1 wherein the control computer identifies a telephone trunk over which each of the telephone calls is transmitted and routes each of the telephone calls based on its identified telephone trunk.

9. An automatic call distributor comprising:
a plurality of gates for interconnecting incoming telephone calls from external callers with selected ones of a plurality of agents;
at least one music source each of which is associated with at least one of the plurality of gates to provide a predetermined type of music to incoming telephone calls routed through the associated at least one gate; and
a control computer for receiving incoming telephone calls, for detecting information regarding the telephone calls, for routing at least one of the incoming telephone calls to selected ones of the plurality of gates based on the information, for placing an incoming telephone call in queue when all agents at the selected gate are unavailable, unavailable agents being unable to presently accept an incoming telephone call, for activating the music source associated with the selected gate to provide the predetermined music to the incoming telephone call, for detecting when an incoming telephone call is placed on hold and for activating one of the music sources to provide music to the call on hold, the music being provided to the incoming telephone call on hold capable of being different than the predetermined music provided the incoming telephone call in queue.

10. The automatic call distributor as claimed in claim 9 wherein the music sources are digital music generators.

11. The automatic call distributor as claimed in claim 9 wherein the control computer comprises caller means for detecting telephone numbers called by the external callers.

12. The automatic call distributor as claimed in claim 11 wherein the caller means uses dialed number identification system information to detect the telephone numbers.

13. The automatic call distributor as claimed in claim 11 wherein the control computer identifies a telephone trunk over which each of the incoming telephone calls are transmitted and routes at least one of the incoming telephone calls based on the identified telephone trunk.

14. The automatic call distributor as claimed in claim 9 wherein the control computer identifies a telephone trunk group containing at least one telephone trunk over which each of the telephone calls is transmitted and routes at least one of the incoming telephone calls based on the identified telephone trunk group.

15. A method for providing a plurality of types of audio communications to an incoming telephone call made by an external caller comprising the steps of:
routing the incoming telephone call to one of a plurality of gates;
connecting a plurality of audio sources to the plurality of gates, each of the audio sources generating one of the plurality of types of audio communications;
detecting when the telephone call is placed in queue;
activating one of the plurality of audio sources connected to the one gate through which the telephone call is routed to provide one of the audio communications to the external caller when the telephone call is placed in queue;
detecting when the telephone call is placed on hold; and
activating another one of the plurality of audio sources to provide another one of the audio communications to the external caller when the telephone call is on hold.

16. The method as claimed in claim 15 wherein the step of connecting a plurality of audio sources comprises the step of connecting a plurality of music sources to the plurality of gates, each of the music sources generating one of a plurality of types of music.

17. The method as claimed in claim 16 wherein the step of routing the incoming telephone call comprises the step of
identifying a telephone number called by the external caller; and
wherein the incoming telephone call is routed to one of the gates based on the telephone number.

18. The method as claimed in claim 17 wherein the step of identifying a telephone number comprises the step of using dialed number identification system information to identify the telephone number.

19. The method as claimed in claim 15 comprising the step of identifying a telephone trunk over which each of the telephone calls are transmitted, and
wherein the step of routing the incoming telephone comprises the step of using the identified telephone trunk to route the telephone call.

* * * * *